United States Patent [19]

Nakayama

[11] Patent Number: 4,996,406
[45] Date of Patent: Feb. 26, 1991

[54] CORE RETAINING APPARATUS FOR WIRE-CUT ELECTRO-DISCHARGE MACHINE

[75] Inventor: Yoshiro Nakayama, Aichi, Japan
[73] Assignee: Mitsubishi Denki Kabushiki Kaisha, Tokyo, Japan
[21] Appl. No.: 497,176
[22] Filed: Mar. 22, 1990

[30] Foreign Application Priority Data

Mar. 31, 1989 [JP]  Japan .................. 1-80573

[51] Int. Cl.⁵ .............................................. B23H 7/02
[52] U.S. Cl. ................................... 219/69.12; 269/20
[58] Field of Search ............... 219/68, 69.11, 69.12, 219/69.16, 69.17; 204/206, 224 M, 297 R; 269/15, 20; 414/676

[56] References Cited

U.S. PATENT DOCUMENTS

| | | | |
|---|---|---|---|
| 3,209,623 | 10/1965 | Schardt | 269/20 |
| 3,998,444 | 12/1976 | Stockwell | 269/20 |
| 4,484,052 | 11/1984 | Inoue | 219/69.12 |
| 4,661,678 | 4/1987 | Wavre | 219/69.12 |
| 4,745,253 | 5/1988 | Girardin | 219/69.12 |

FOREIGN PATENT DOCUMENTS 109617  5/1986  Japan .

*Primary Examiner*—Geoffrey S. Evans
*Attorney, Agent, or Firm*—Sughrue, Mion, Zinn, Macpeak and Seas

[57] ABSTRACT

A core retaining apparatus for a wire-cut electro-discharge machine which is capable of effectively and reliably retaining a core cut out of a workpiece by wire-cut electro-discharge machining when the core is removed to a position outside the machining area. The core retaining apparatus comprises a core retaining element for retaining a core cut out of a workpiece, the element being elastic and having a space therein, and pressure control elements for maintaining the pressure inside the space at a desired value.

11 Claims, 6 Drawing Sheets

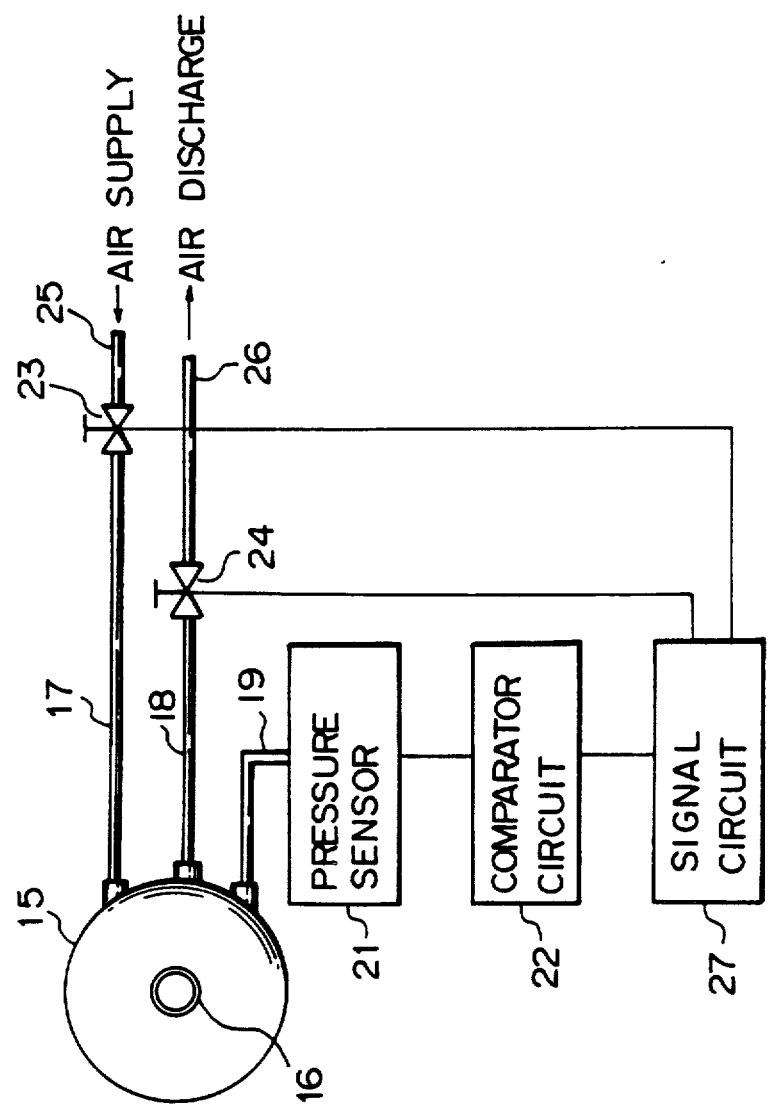

CORE RETAINING APPARATUS FOR WIRE-CUT ELECTRO-DISCHARGE MACHINE

BACKGROUND OF THE INVENTION

1. Field of the Invention

The present invention relates to a core retaining apparatus for a wire-cut electro-discharge machine which is capable of effectively and reliably retaining a core cut out of a workpiece by wire-cut electro-discharge machining when the core is removed to a position outside the machining area.

2. Description of the Prior Art

FIG. 4 exemplarily shows a wire-cut electro-discharge machine having a conventional core retaining apparatus which is in a core removing state. In the figure, the reference numeral 6 denotes a workpiece; 7, a core cut out of the workpiece 6; 8, a core holding device which holds the core 7; 9, an arm which supports the core holding device 8; 10, a shaft which is movable up and down while supporting the arm 9 in such a manner that the arm 9 is rotatable about the axis of the shaft 10; 11, a lower dielectric fluid supply nozzle which has a wire electrode (not shown) passed therethrough and which jets out a dielectric fluid (not shown) in the direction of the axis thereof; 12, a support member which supports the lower dielectric fluid supply nozzle 11; 13, an insulating plate to which the support member 12 is secured; and 14, a lower arm which supports the insulating plate 13.

FIG. 5 shows the way in which a core is removed from a workpiece having a back recess. In the figure, the reference numeral 6a denotes a workpiece having a back recess. Since the other reference numerals that are the same as those shown in FIG. 4 denote the same elements or portions, description thereof is omitted.

FIGS. 6A and 6B exemplarily show cutouts which may be made in a workpiece by a machining process, in which the reference numerals 1 to 5 denote cutouts made in the workpiece 6.

The operation will next be explained. To make such cutouts 1 to 5 in series in one workpiece 6, the wire electrode is first passed through a bore provided in the center of the area corresponding to the cutout 1 and machining is carried out with the bore as the starting point. The core 7 that is cut out of the workpiece 6 upon completion of the machining is automatically removed, and subsequently the above-described operation is repeated for the other cutouts 2 to 5, thus executing unmanned continuous machining.

FIG. 4 sows the process of removing the core 7 from the workpiece 6 during the machining process. The core 7 that is cut out of the workpiece 6 upon completion of the machining for the cutout 1 is supported by the lower dielectric fluid supply nozzle 11 that is secured to the support member 12 on the insulating plate 13 attached to the distal end of the lower arm 14 so that the core 7 will not fall into a work tank (not shown). Then, the shaft 10 is rotated so that the core holding device 8 that is provided at the distal end of the arm 9 is moved from a position outside the machining area to a position directly above the core 7. Thereafter, the shaft 10 is lowered so that the core holding device 8 can hold the core 7. Subsequently, the shaft 10 is raised and then rotated to carry the core 7 held by the core holding device 8 to a position outside the machining area. Thereafter, the core holding device 8 releases the core 7.

The conventional core retaining apparatus is arranged such that the core 7 is supported by the upper side of the lower dielectric fluid supply nozzle 11 so that the core 7 will not fall into the work tank upon completion of machining of the cutout 1, for example, when it is removed from the workpiece 6 to a position outside the machining area.

Accordingly, the conventional core retaining apparatus for a wire-cut electro-discharge machine has the following problems:

When the workpiece 6 has a configuration such as that shown in FIG. 5 or the shape of a cutout or the way of using the associated jig or tool is not conformable to the prior art arrangement, the core 7 that is cut out of the workpiece 6 upon completion of a certain machining process cannot effectively be supported by the lower dielectric fluid nozzle 11 and may fall or tilt; in such a case, the core 7 cannot be held by the core holding device 8 and hence cannot automatically be removed.

SUMMARY OF THE INVENTION

In view of the above-described problems of the prior art, it is a primary object of the present invention to provide a core retaining apparatus for a wire-cut electro-discharge machine which is capable of effectively and reliably retaining a core cut out of a workpiece without being restricted by the workpiece configuration, the shape of a cutout or the way of using the associated jig or tool.

To this end, the present invention provides a core retaining apparatus for a wire-cut electro-discharge machine, comprising: core retaining means for retaining a core cut out of a workpiece, the means being elastic and having a space therein; and pressure control means for controlling the pressure inside the space to a desired value.

By virtue of the above-described arrangement, the core cut out of a workpiece is effectively and reliably supported by the core retaining means which is elastic and the pressure inside the space which is set to a desired value by the pressure control means.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and of which:

FIG. 2 is a control system diagram showing the way in which the air pressure inside the core retaining block according to the embodiment of the present invention is controlled;

DESCRIPTION OF THE PREFERRED EMBODIMENT

One embodiment of the present invention will be described below in detail with reference to the accompanying drawings.

Figure 1A:
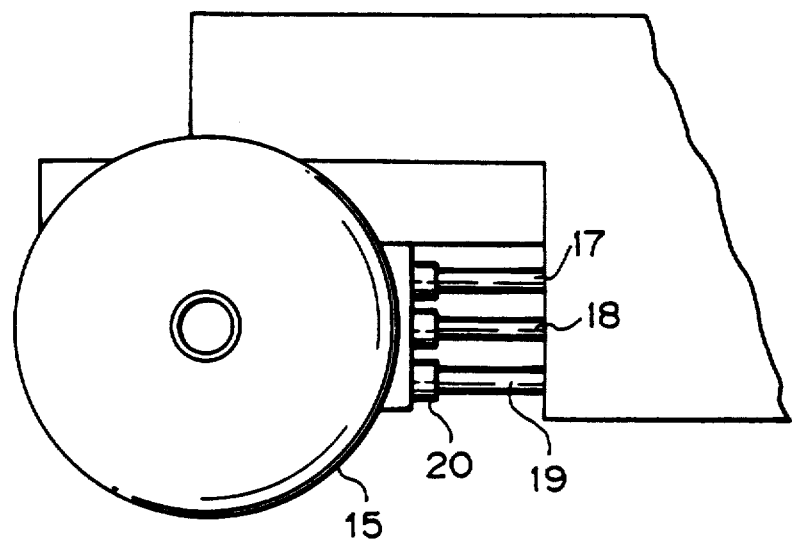
FIGS. 1A and 1B show the arrangement of one embodiment of the core retaining apparatus for a wire-cut electro-discharge machine according to the present invention.
Figure 1B:
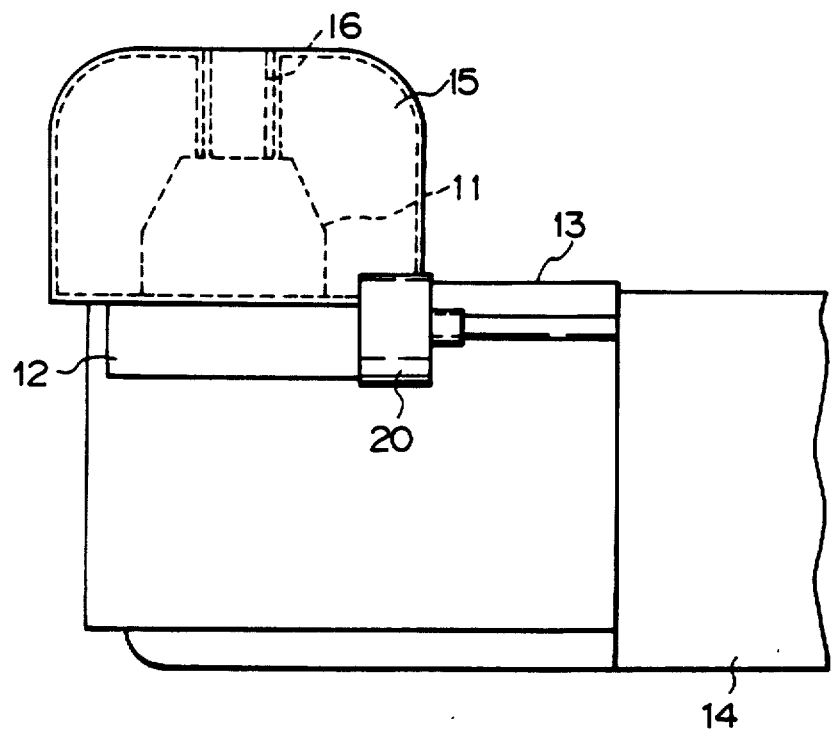

Referring first to FIGS. 1A and 1B, the reference numeral 15 denotes a core retaining block corresponding to the core retaining means in the present invention which is formed from an elastic material (e.g., rubber) in such a manner as to surround and almost cover over the lower dielectric fluid supply nozzle 11. The reference numeral 16 denotes a ring which extends through the core retaining block 15 as far as the upper side of the lower dielectric fluid supply nozzle 11 and which has a path provided therein to pass a wire electrode. The reference numeral 17 denotes an air supply hose for supplying air to the inside of the core retaining block 15; 18, an air discharge hose for discharging the air from the core retaining bock 15; 19, a pressure detecting hose for detecting the air pressure inside the core retaining block 15; and 20, connecting members for respectively connecting the air supply hose 17, the air discharge hose 18 and the pressure detecting hose 19 to the core retaining block 15.

FIG. 2 is a control system diagram which shows the way in which the air pressure inside the core retaining block 15 is controlled. In the figure, the reference numeral 21 denotes a pressure sensor connected to the pressure detecting hose 19 to detect the level of the air pressure inside the core retaining block 15. The reference numeral 22 denotes a comparator circuit which has reference data for maintaining the air pressure inside the core retaining block 15 at a constant level and which compares the air pressure inside the core retaining block 15 detected by the pressure sensor 21 with the reference data. The reference numeral 23 denotes a first control valve for controlling the amount of air supplied; 24, a second control valve for controlling the amount of air discharged; 25, a hose for connection between the first control valve 23 and an air supply source (not shown); 26, a hose for discharging the air from the second control valve 24 to a desired place; and 27, a signal circuit which opens or closes the first and second control valves 23 and 24 on the basis of the result of the comparison made by the comparator circuit 22, thereby maintaining the air pressure inside the core retaining block 15 at a constant level. It should be noted that the pressure sensor 21, the comparator circuit 22, the first control valve 23, the second control valve 24 and the signal circuit 27 constitute in combination the pressure control means in the present invention.

Figure 3:
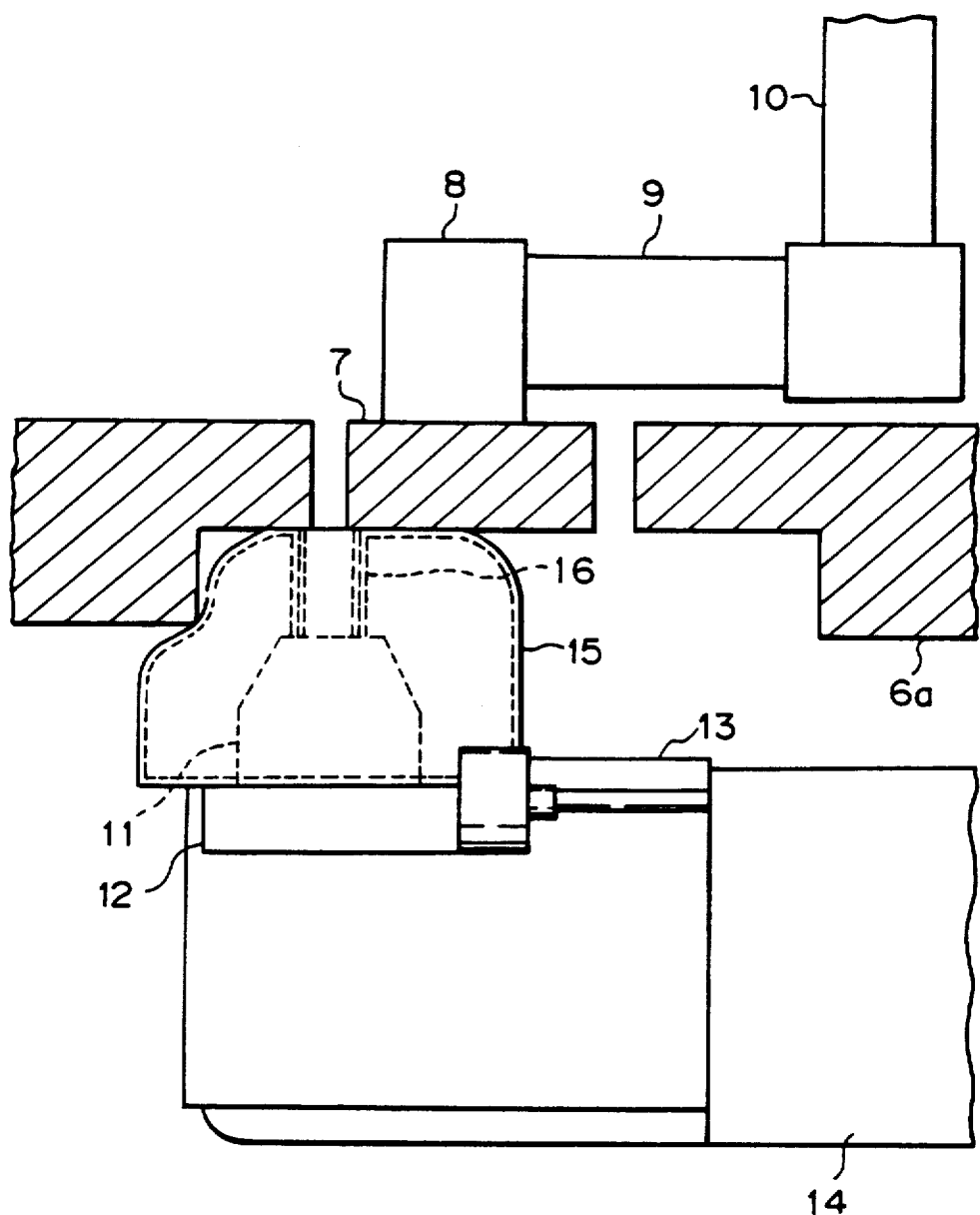
FIG. 3 shows the operation of the core retaining block according to the embodiment of the present invention.
Figure 4:
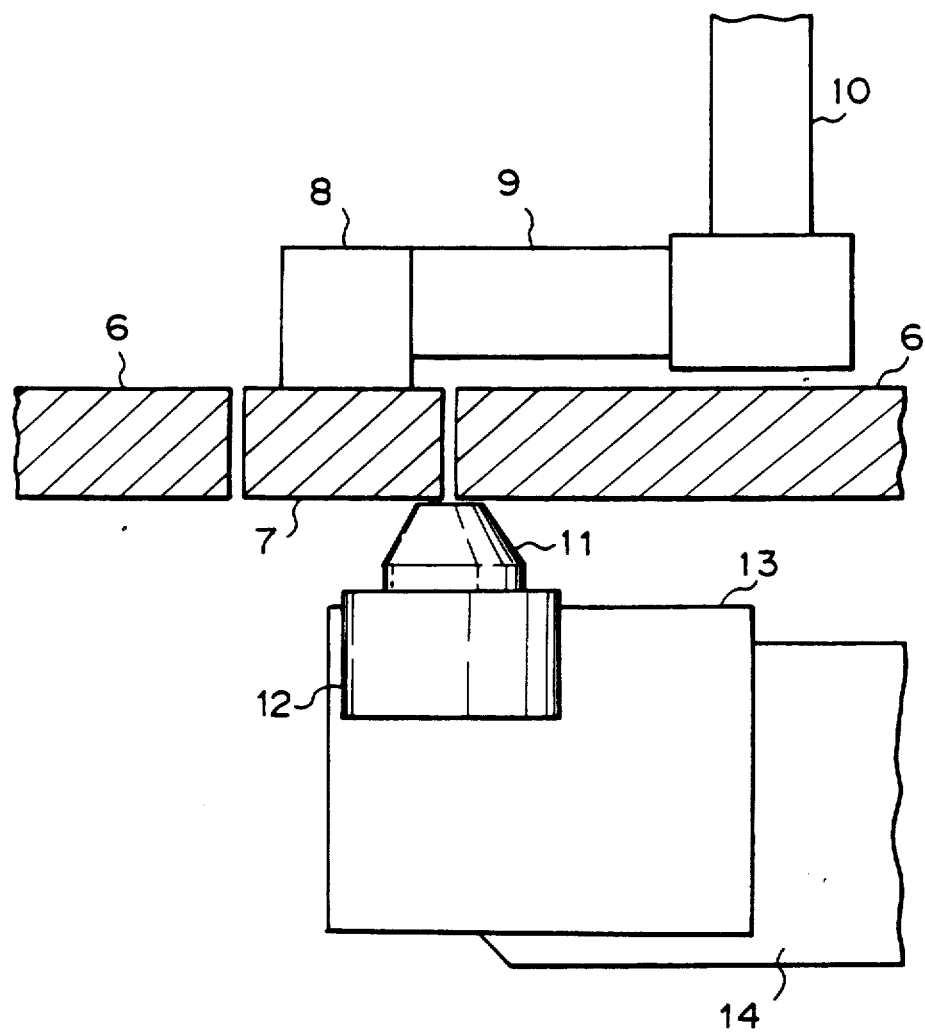
FIG. 4 shows the arrangement of a conventional core retaining apparatus for a wire-cut electro-discharge machine.
Figure 5:
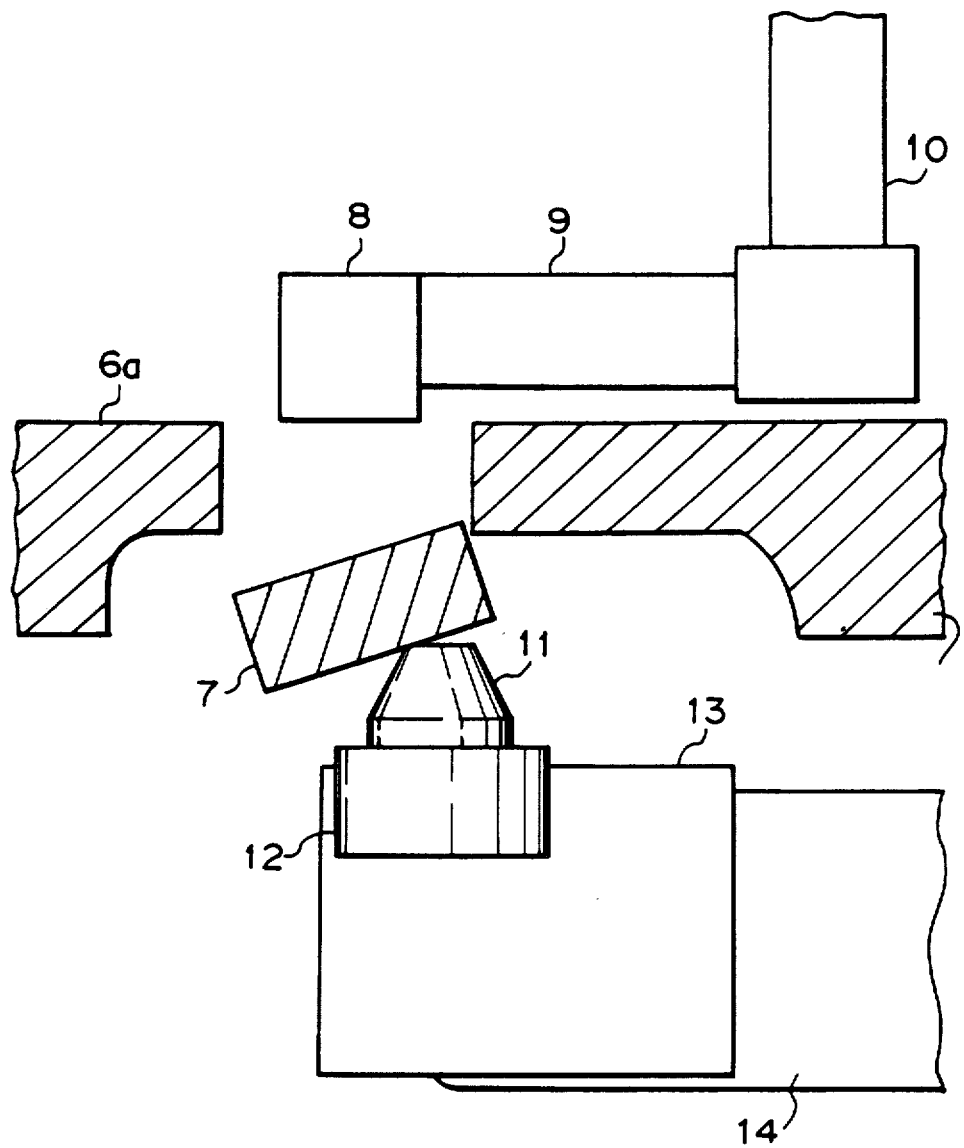
FIG. 5 shows the way in which a core is removed from a workpiece having a back recess.
Figure 6A:
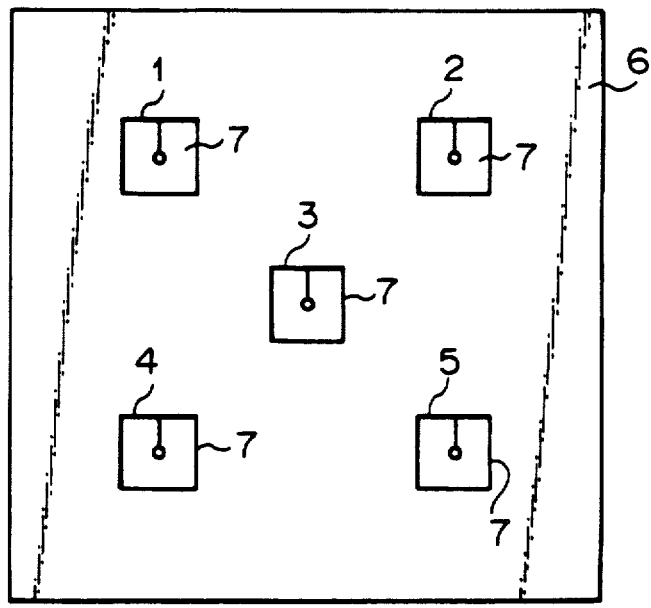
FIGS. 6A and 6B exemplarily show cutouts made in a workpiece by a machining process.
Figure 6B:
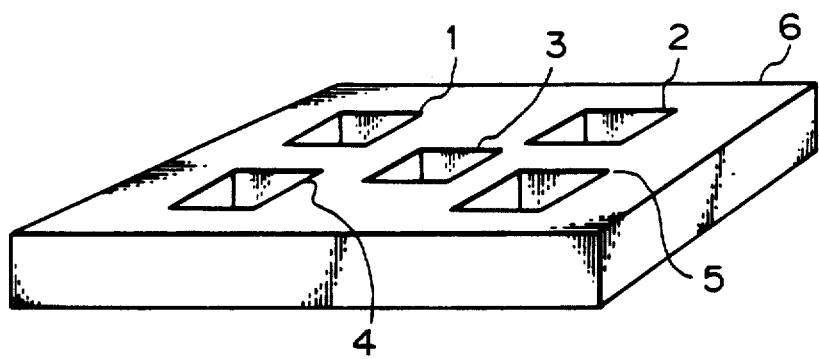

FIG. 3 shows the operation of the core retaining block 15. Since the constituent elements of the arrangement shown in FIG. 3 are the same as those shown in FIG. 1 and FIG. 5 which shows the prior art, description thereof is omitted.

The operation will next be explained. When a workpiece 6a having a back recess such as that shown in FIG. 3 is machined, the core retaining block 15 is properly depressed at a part thereof which is contacted by a projecting portion of the workpiece 6a having a back recess and the air pressure inside the core retaining block 15 is controlled such that the core retaining block 15 is capable of supporting the core 7 with sufficient force at a portion thereof which bears the core 7 in order to prevent the core 7 from falling into the work tank upon completion of the machining process.

More specifically, reference data corresponding to a proper level of air pressure to retain the core 7 effectively and reliably is first set in the comparator circuit 22 shown in FIG. 2. On the other hand, the air pressure inside the core retaining block 15 is constantly detected with the pressure sensor 21 through the pressure detecting hose 19 and the detected value is inputted to the comparator circuit 22 at all times.

For instance, when the air pressure inside the core retaining block 15 detected by the pressure sensor 21 is lower than the air pressure corresponding to the reference data, a signal to raise the air pressure is output from the comparator circuit 22 to the signal circuit 27. In response to the signal, the signal circuit 27 opens the first control valve 23 to supply air to the air supply hose 17 from the air supply source through the hose 25, thus introducing the air into the core retaining block 15. When the air pressure inside the core retaining block 15 is made coincident with the air pressure corresponding to the reference data by the air introduced, the first control valve 23 is closed and the air pressure inside the core retaining block 15 is thus maintained at a constant level. When the air pressure inside the core retaining block 15 that is detected by the pressure sensor 21 is higher than the air pressure corresponding to the reference data, a signal to lower the air pressure is output from the comparator circuit 22 to the signal circuit 27. In response to the signal, the signal circuit 27 opens the second control valve 24 to discharge the air from the core retaining block 15 from the hose 26 through the air discharge hose 18, and when the air pressure inside the core retaining block 15 becomes coincident with the air pressure corresponding to the reference data, the second control valve 24 is closed, so that the air pressure inside the core retaining block 15 is maintained at a constant level.

Thus, the air pressure inside the core retaining block 15 is properly controlled in conformity with the configuration of each particular workpiece or the shape of a cutout and it is therefore possible to effectively and reliably retain a wide variety of cores 7. The core 7 that is retained by the core retaining block 15 in this way is removed to a position outside the machining area by the same operation as that shown in the description of the prior art, thus completing the core removing operation.

Although in the foregoing embodiment air is introduced into the core retaining block 15, it should be noted that the use of air is not necessarily exclusive and that advantageous effects similar to those in the described embodiment can also be obtained by the use of, for example, a liquid or bulk material.

Although in the foregoing embodiment the core retaining block 15 is provided in such a manner as to surround the lower dielectric fluid supply nozzle 11, this arrangement is not necessarily exclusive and the core retaining block 15 may be disposed in the vicinity of the nozzle 11. In such a case also, it is possible to obtain the same advantageous effects as those in the described embodiment.

As has been described above, the core retaining apparatus of the present invention comprises a core retaining block which is formed from an elastic material and arranged such that the pressure inside the space provided therein can be set to a desired value. It is therefore possible to effectively and reliably retain the core cut out of a workpiece without any danger of the core falling.

Although the present invention has been described through specific terms, it should be noted here that the described embodiment is not necessarily exclusive and that various changes and modifications may be imparted thereto without departing from the scope of the invention which is limited solely by the appended claim.

What is claimed is:

1. A core retaining apparatus for a wire-cut electrodischarge machine, comprising:
   core retaining means for retaining a core cut out of a workpiece, said means being elastic and having a space therein; and
   pressure control means for controlling the pressure inside said space to a desired value.

2. A core retaining apparatus as claimed in claim 1, wherein said core retaining means is disposed in the vicinity of a lower dielectric fluid supply nozzle.

3. A core retaining apparatus as claimed in claim 2, wherein said core retaining means is disposed around said lower dielectric fluid supply nozzle.

4. A core retaining apparatus as claimed in claim 3, wherein fluid material is introduced into or evacuated from the space inside said core retaining means.

5. A core retaining apparatus as claimed in claim 4, wherein said fluid material is in the form of air, a liquid or bulk material.

6. A retaining apparatus as claimed in claim 5, wherein said core retaining means is formed from a rubber.

7. A core retaining apparatus as claimed in claim 1, wherein said pressure control means comprises pressure sensing means for sensing the pressure in said space, comparing means for comparing the pressure sensed by said pressure sensing means to a predetermined reference pressure and signaling means for outputting a signal to control the pressure in said space inside said core retaining means.

8. A core retaining apparatus as claimed in claim 7, wherein said core retaining means is connected to a fluid supply hose, a fluid discharge hose and a pressure detecting hose.

9. A core retaining apparatus as claimed in claim 8, wherein said pressure detecting hose is connected to said pressure sensing means.

10. A core retaining apparatus as claimed in claim 8, wherein said fluid supply an discharge hoses are provided with control valves which are controlled by said signal from said signaling means.

11. A wire-cut electro-discharge machine for machining a workpiece by virtue of an electro-discharge occurring between a wire electrode and said workpiece, said machine characterized in comprising:
    a lower fluid supply nozzle disposed under said workpiece with said wire electrode passed therethrough for supplying a dielectric fluid between said wire electrode and said workpiece,
    means movable between a machining area above said workpiece and a non-machining area for carrying out a core cutout of said workpiece from said machining area,
    core retaining means disposed in the vicinity of said lower dielectric fluid supply means for retaining said core so that said core does not fall, said core retaining means being elastic and having a space therein, and
    pressure control means for controlling the pressure inside said space to a desired value to hold said core in place.

* * * * *